United States Patent
Yamamoto

(10) Patent No.: US 6,906,992 B2
(45) Date of Patent: Jun. 14, 2005

(54) OPTICAL PICKUP DEVICE AND OPTICAL RECORDING AND REPRODUCING APPARATUS INCLUDING THE OPTICAL PICKUP DEVICE

(75) Inventor: Kenji Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/764,636

(22) Filed: Jan. 26, 2004

(65) Prior Publication Data

US 2004/0156303 A1 Aug. 12, 2004

(30) Foreign Application Priority Data

Jan. 27, 2003 (JP) .................................... P2003-017973

(51) Int. Cl.$^7$ ................................................ G11B 7/00
(52) U.S. Cl. .................... 369/112.23; 369/121
(58) Field of Search .......................... 369/112.01, 116, 369/122, 44.23, 44.24, 112.23, 121

(56) References Cited

U.S. PATENT DOCUMENTS 5,991,102 A * 11/1999 Oono et al. ................ 359/820

* cited by examiner

Primary Examiner—Nabil Hindi
(74) Attorney, Agent, or Firm—Sonnenschein, Nath & Rosenthal LLP

(57) ABSTRACT

An optical pickup device 20 comprises an objective lens, a light source 1 composed of a blue semiconductor laser with a wavelength ranging from 400 to 415 nm and a collimator lens 2 for collimating light L1 from this light source 1 to provide substantially-collimated light, wherein Abbe number v of a glass material of the collimator lens 2 satisfies 61<v<90, a linear expansion coefficient α satisfies $55<10^7 \times \alpha/K<120$, and a refractive index temperature coefficient (dn/dt) satisfies $-1.8<10^6 \times (dn/dt)/K<+1.5$. Since the position at which the focal point of the collimator lens 2 was displaced due to fluctuation of temperature and fluctuation of wavelength can be compensated for at high accuracy, the optical pickup device can increase recording density and storage capacity of an optical recording medium.

2 Claims, 4 Drawing Sheets

OPTICAL PICKUP DEVICE AND OPTICAL RECORDING AND REPRODUCING APPARATUS INCLUDING THE OPTICAL PICKUP DEVICE

BACKGROUND OF THE INVENTION

1. Field of the Invention

The present invention relates to an optical pickup device for reproducing and recording information from and on an optical recording medium and an optical recording and reproducing apparatus including the optical pickup device.

2. Description of the Related Art

Optical recording mediums such as an optical disc and an optical memory card are widely used as storage mediums for storing therein video information, audio information or programs for use with information equipment and so on.

As these optical recording mediums are progressively increasing their recording densities and storage capacities, an optical pickup device is increasingly reducing a diameter of a beam spot focused on an optical recording medium through an objective lens either by reducing a wavelength of laser light from a light source, e.g. a semiconductor laser or by increasing an NA (numerical aperture) of an objective lens.

For example, while a CD (compact disc), which became commercially available on the market in the relatively early stage, sets a wavelength of light emitted from a light source to 780 nm, a DVD (digital versatile disc), which became commercially available on the market in the later stage, sets a wavelength of light emitted from a light source to 650 nm or 635 nm.

In recent years, as a demand for realizing higher recording density and larger storage capacity is increasing, a wavelength of light emitted from a light source tends to become shorter increasingly.

Concurrently therewith, in order to increase an information recording capacity of an optical recording medium, a wavelength of light emitted from a light source should be reduced much more, and it is proposed to construct an optical pickup device by a blue semiconductor laser (LD) having a wavelength ranging of from 400 nm to 415 nm.

This previously-proposed optical pickup device using this blue semiconductor laser as a light source includes a collimator lens located between a light source and an objective lens for focusing light on an optical recording medium (optical disc, etc.), to collimate light emitted from the blue semiconductor laser of the light to provide collimated light.

A distance between the lens and the laser light emission point is adjusted in such a manner that the laser light emission point may become identical with the position of the focal point of the collimator lens.

However, since it is customary for the optical pickup device to make a holding member (base member) for holding thereon optical assemblies by aluminum, magnesium and the like and these materials are expanded and contracted due to ambient temperature, it is mechanically unavoidable that the position of the focal point of the collimator lens and the light emission point of the laser will not become identical with each other due to change of temperature.

Unless the light emission point of the laser becomes identical with the position of the focal point of the collimator lens as described above, light emitted from the collimator lens is no longer collimated light but becomes diverging light or converging light. If light in the above diverged or converged state is focused by the objective lens, then optical aberration occurs so that information cannot be accurately read out from the optical recording medium any longer.

Various technologies have been so far devised to correct a space between the collimator lens and the light emission point of the laser so that this space will not change optically, i.e., the position of the focal point of the lens may follow movement of the light emission point of the laser even when temperature fluctuates.

As a method for correcting temperature fluctuation, it is proposed to select material of lens and the number of lens by making good use of optical properties and mechanical properties of mainly material of lens in a lens design.

Variables that should be taken into consideration in a lens design may be (1) expansion and contraction of an optical assembly attachment base (holding member) due to fluctuation of temperature; (2) fluctuation of a refractive index of a lens due to fluctuation of temperature; (3) fluctuation of a refractive index of a lens due to fluctuation of a wavelength of light from a semiconductor laser in accordance with change of temperature; and (4) expansion and contraction of a lens itself due to change of temperature.

Since in most cases it is sufficient to set material of collimator lens and lens configuration such as the number of lens so as to cope with fluctuation of temperature in the wavelength region of a red semiconductor laser (wavelength 630 nm to 660 nm) for use with a DVD (digital versatile disc), for example, in most cases, freedom in an optical design was large and there were many solutions that can satisfy the conditions.

On the other hand, when a blue semiconductor laser is used as a light source, freedom in an optical design is limited extremely.

The reason for this is that when the blue semiconductor laser is used as the light source, chromatic aberration increases considerably as compared with the case of the red semiconductor laser so that not only fluctuation of temperature should be corrected but also chromatic aberration should be corrected.

Since chromatic aberration occurs due to wavelength dependence of refractive index of lens and the semiconductor laser has properties to fluctuate its wavelength in accordance with intensity of emitted light, the refractive index of the lens changes in response to the fluctuation of wavelength, and hence the focal length of lens changes unavoidably.

For example, upon recording, intensity of recording laser output increases several tens of times as high as the intensity of reproducing laser output, and hence the oscillation wavelength also changes from the oscillation wavelength required upon playback.

Accordingly, both in the recording mode and the reproducing mode, fluctuation of temperature and chromatic aberration should be corrected in such a manner that the position of the focal point of the collimator lens may become identical with the light emission point of the laser.

Therefore, an optical pickup device using a blue semiconductor laser light source needs an arrangement by which both of fluctuation of temperature and chromatic aberration can be corrected.

In order to suppress chromatic aberration, it has been proposed to use a special glass material of properties in which a refractive index less fluctuates relative to fluctuation of wavelength (see cited patent reference 1) and to construct a collimator lens by a large number of lens groups composed of more than two kinds of glass materials with different optical properties.

[Cited Patent Reference 1]

Official gazette of Japanese laid-open patent application No. 2001-243650

However, if a special glass material is used to form a collimator lens and a collimator lens is consists of lens groups comprising a large number of elements, then a cost of assemblies of the collimator lens increases and the optical pickup device also becomes costly.

Considering the optical pickup device from a money standpoint, it is desired that a lens configuration of the collimator lens should be a simple configuration such as a cemented lens comprising one element or two elements, one group at most.

When the blue semiconductor laser is used as the light source, both of the fluctuation of temperature and the chromatic aberration should be corrected. Further, considering a cost of a lens, the kind of lens materials that can be applied to the collimator lens is limited considerably, and hence lens design becomes very difficult.

Moreover, since a depth of focus of the collimator lens is proportional to a wavelength $\lambda$, if the blue semiconductor laser is used as the light source, then a depth of focus decreases as compared with the case in which the red semiconductor laser is used as the light source. As a consequence, a tolerance of errors caused in the position of the focal point of the collimator lens relative to the light emission point of the laser when the temperature fluctuates and the wavelength fluctuates (chromatic aberration occurs) becomes extremely limited.

For this reason, the optical pickup device needs an optical system capable of highly-accurately compensating for the focal point position displaced when temperature fluctuates and the wavelength fluctuates.

SUMMARY OF THE INVENTION

In view of the aforesaid aspects, it is an object of the present invention to provide an optical pickup device capable of highly-accurately compensating for the focal point position displaced when temperature fluctuates and a wavelength fluctuates so that an optical recording medium becomes able to increase recording density and storage capacity.

Another object of the present invention is to provide an optical recording and reproducing apparatus and including the optical pickup device to reproduce and record information from and on an optical recording medium that is high in recording density and large in storage capacity.

According to an aspect of the present invention, there is provided an optical pickup device which is comprised of an objective lens, a light source composed of a blue semiconductor laser with a wavelength ranging from 400 nm to 415 nm and a collimator lens for collimating light emitted from the light source to provide substantially-collimated light, wherein Abbe number v of a glass material of the collimator lens satisfies $61<v<90$, a linear expansion coefficient $\alpha$ satisfies $55<10^7 \times \alpha/K<120$, and a refractive index temperature coefficient (dn/dt) satisfies $-1.8<10^6 \times (dn/dt)/K<+1.5$.

According to the above-mentioned arrangement of the optical pickup device of the present invention, since the optical pickup device includes the collimator lens made of the glass material that can satisfy the above-mentioned conditions, even when the optical pickup device is in use while temperature is being fluctuated and a wavelength fluctuates due to change of intensity of light emitted from a semiconductor laser, it becomes possible to enable a light emission point of a semiconductor laser to constantly become identical with the focal point position of the collimator lens.

Thus, light emitted from the collimator lens constantly becomes substantially-collimated light.

Further, it becomes possible to provide the collimator lens consisting of only one element that can act as described above by using the glass material that can satisfy the above respective conditions.

According to another aspect of the present invention, there is provided an optical recording and reproducing apparatus which is comprised of an optical pickup device and control means for controlling driving of the optical pickup device. The optical pickup device comprises an objective lens, a light source composed of a blue semiconductor laser with a wavelength ranging from 400 nm to 415 nm and a collimator lens for collimating light emitted from the light source to provide substantially-collimated light, wherein Abbe number v of a glass material of the collimator lens satisfies $61<v<90$, a linear expansion coefficient $\alpha$ satisfies $55<10^7 \times \alpha/K<120$, and a refractive index temperature coefficient (dn/dt) satisfies $-1.8<10^6 \times (dn/dt)/K<+1.5$.

According to the arrangement of the optical recording and reproducing apparatus of the present invention, since the optical recording and reproducing apparatus includes the above-mentioned inventive optical pickup device, light emitted from the collimator lens constantly becomes substantially-collimated light. This substantially-collimated light can be focused by the objective lens and hence can be irradiated on the optical recording medium (e.g., optical disc) with a very small beam spot.

Inconsequence, it becomes possible to accurately reproduce and record information from and on the optical recording medium (e.g., optical disc) having a high recording density and a large storage capacity.

DESCRIPTION OF THE PREFERRED EMBODIMENT

Figure 1:
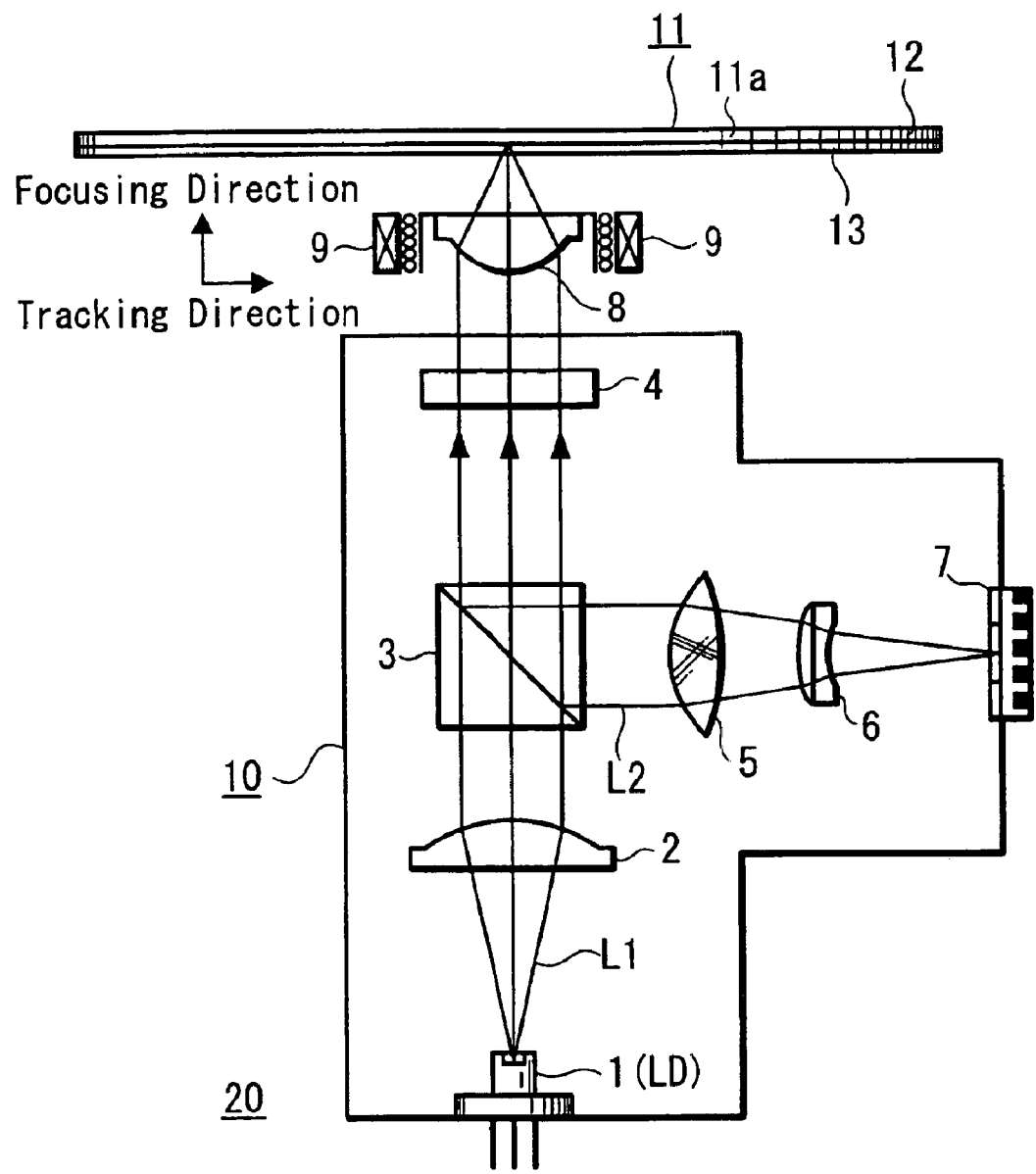
FIG. 1 is a diagram schematically showing an arrangement of an optical pickup device according to an embodiment of the present invention.

The present invention will now be described below with reference to the drawings. FIG. 1 of the accompanying drawings is a diagram showing a schematic arrangement of an optical pickup device according to an embodiment of the present invention.

As shown in FIG. 1, an optical pickup device, generally depicted by reference numeral 20, includes an optical assembly attachment base 10 serving as a supporting member to which there are attached respective optical assemblies of a semiconductor laser 1 (LD (laser diode)) serving as a light source, a collimator lens 2 for collimating light emitted from the light source 1 to provide substantially-collimated light, a polarizing beam splitter 3 for dividing light L1 emitted from the light source 1 and returned light L2 from an optical disc 11 serving as an optical recording medium, a quarter-wave plate 4 located between the polarizing beam splitter 3 and an objective lens 8, a focusing lens 5, a multi-lens 6 and a photo-detector 7. Outside the optical assembly attachment base 10, the optical pickup device 20 further includes the objective lens 8 for focusing light on the optical disc 11 and a biaxial actuator 9 for driving the objective lens 8.

The optical disc 11 shown in FIG. 1 has an information recording surface 11a provided between a substrate 12 and a protective layer 13.

A blue semiconductor laser that can emit light having a wavelength ranging from 400 nm to 415 nm is used as the semiconductor laser 1 (LD) serving as the light source.

The collimator lens 2 is composed of a single element considering a cost of the optical pickup device 20.

A space between the semiconductor laser 1 and the collimator lens 2 is adjusted in advance so that the collimator lens 2 may collimate the light L1 from the semiconductor laser 1 to provide plane wave. It has been customary to adjust the space between the semiconductor laser 1 and the collimator lens 2 at ordinary temperature in the state in which intensity of the output of the semiconductor laser 1 is held at low level.

When this space is adjusted as described above, the semiconductor laser 1 and the collimator lens 2 are located in such a manner that the focal point position of the collimator lens 2 may become identical with the light emission point of the semiconductor laser 1.

In this optical pickup device 20, in order to reproduce information from the optical disc 11 or in order to record information on the optical disc 11, laser light is irradiated on the optical disc 11 as follows.

The light L1 emitted from the semiconductor laser 1 (LD) serving as the light source is linearly-polarized beam of which wavelength falls within a range of from 400 to 415 nm. A diffraction grating, not shown, diffracts this emitted light L1 to provide zero-th order light and ±first-order lights. The collimator lens 2 converts these rays of light from diverging rays of light into substantially-collimated rays of light. The linearly-polarized beam converted into collimated rays of light is passed through the polarizing beam splitter 3, converted into circularly-polarized light beam by the quarter-wave plate 4 and focused and irradiated on the information recording surface 11a of the optical disc 11 by the objective lens 8.

The returned light L2 of the circularly-polarized light beam reflected on this information recording surface 11a is converted by the quarter-wave plate 4 into linearly-polarized light beam of which polarizing direction is rotated 90° relative to that of the linearly-polarized light beam of the outward light. The polarizing beam splitter 3 reflects the linearly-polarized light beam of which polarizing direction is rotated 90° relative to that of the linearly-polarized light beam of the outward light so that this linearly-polarized light beam is divided from the emitted light L1. This linearly-polarized light beam is passed through the focusing lens 5 and the multi-lens 6 and is thereby focused on the photo-detector 7. This photo-detector 7 includes a plurality of light-receiving elements and executes calculation processing based upon light intensities of the zero-th order light and the ±first-order lights irradiated on a plurality of divided light-receiving elements to thereby detect a focusing error signal, a tracking error signal and an RF signal and the like.

Under control of the biaxial actuator 9, the objective lens 8 is moved in the tracking direction of the optical disc 11 and is also moved in the focusing direction of the optical disc 11. Then, feedback servo control operations of focusing servo control and tracking servo control are effected under control of control signals based upon the above-mentioned focusing error signal and tracking error signal.

In the optical pickup device 20 having the arrangement shown in FIG. 1, when temperature fluctuates, (1) the optical assembly attachment base 10 is expanded and contracted, (2) the refractive index of the collimator lens 2 is fluctuated when the wavelength of the semiconductor laser 1 fluctuates, (3) the refractive index of the collimator lens 2 is fluctuated, (4) the collimator lens 2 itself is expanded and contracted.

The collimator lens 2 should be designed in consideration of influences exerted when the temperature fluctuates. Otherwise, the focal point position of the collimator lens 2 and the light emission point of the semiconductor lens 1 do not become identical with each other as mentioned before, and the light emitted from the collimator lens 2 is deviated from the collimated light.

Alternatively, (5) the refractive index of the collimator lens 2 is fluctuated, i.e., chromatic aberration occurs due to waveform fluctuations caused when intensity of light from the semiconductor laser 1 fluctuates.

The collimator lens 2 should be designed in consideration of the chromatic aberration caused by this waveform fluctuation. Otherwise, the focal point position of the collimator lens 2 and the light emission point of the semiconductor laser 1 do not become identical with each other as mentioned before, and the light emitted from the collimator lens 2 is deviated from the collimated light.

As a result, optical aberration occurs in the light focused by the objective lens 8 so that information cannot be reproduced from the optical disc 11 or information cannot be recorded on the optical disc 11 accurately.

Therefore, in the optical pickup device 20 according to this embodiment, the collimator lens 2 is designed properly and the optimum material of the collimator lens 2 is selected, whereby the light emission point of the semiconductor laser 1 can constantly become identical with the focal point position of the collimator lens 2 optically within a tolerance even when temperature fluctuates and intensity of light fluctuates.

A tolerance of error between the focal point position of the collimator lens 2 and the light emission point of the semiconductor laser 1 becomes very limited in the wavelength region (400 nm to 415 nm) of the blue semiconductor laser used in this embodiment as compared with the wavelength region of the related-art red semiconductor laser because the depth of focus is proportional to the wavelength λ of the light emitted from the semiconductor laser 1. For this reason, displacements caused by fluctuations of temperature and fluctuations of intensity of light should be compensated for optically at high accuracy.

Then, having considered compensations for the defects (1) to (4) caused by the aforementioned fluctuations of temperature and compensation on the defect (5) caused by the fluctuation of light intensity, there was designed the collimator lens 2 in which the light emission point of the semiconductor laser 1 may constantly fall within the tolerance from the focal point position of the collimator lens 2.

First, in order to compensate for chromatic aberration, a material having a large Abbe number v that is an optical constant indicative of chromatic dispersion characteristic of refractive index of glass was selected. Glass has smaller fluctuation of refractive index relative to wavelength and smaller chromatic aberration as it has a larger Abbe number v. However, there are relatively few glass whose Abbe number is large in excess of 60 and a range of choosing such glass is limited.

With respect to compensation of temperature, an optimum combination of expansion coefficient of the collimator lens 2, the wavelength dependence of the refractive index of the collimator lens 2 and the temperature coefficient of the refractive index was calculated by lens design in such a manner that (1) of the expansion and contraction of the optical assembly attachment base 10 may be canceled by the effects of (2) to (4).

Elements by which the focal length of the collimator lens 2 increase are expansion of the collimator lens 2, increase of wavelength of the semiconductor laser 1 and decrease of refractive index of the collimator lens 2 due to fluctuation of temperature.

Conversely, elements by which the focal length of the collimator lens 2 decrease are contraction of the collimator lens 2, decrease of the wavelength of the semiconductor laser 1 and increase of refractive index of the collimator lens due to fluctuation of temperature.

As a result of simulation of lens design, the assignee of the present application has reached the conclusion that, of glass materials available at present in the industrial world, very few glass materials can satisfy the conditions of both of the above-mentioned temperature compensation and chromatic aberration compensation, very few glass materials can be suitable for the application to the optical pickup device (e.g., glass material having low transmittance of laser light cannot be applied to the optical pickup device) and that glass material can satisfy the extremely limited conditions which will follow.

Specifically, in the optical pickup device 20 according to this embodiment, in particular, a glass material for use with the collimator lens 2 may have Abbe number v, linear expansion coefficient α and refractive index temperature coefficient dn/dt which may fall within the following ranges:
Abbe number: $61 < v < 90$
Linear expansion coefficient: $55 < 10^7 \times \alpha/K < 120$
Refractive index temperature coefficient:
$-1.8 < 10^6 \times (dn/dt)/K < +1.5$ At present, of glass materials that are available from an industry standpoint, the following glass materials can satisfy the above-mentioned conditions:

Glass material manufactured by HOYA CORPORATION (JAPAN) under trade name of FC5:
Glass material manufactured by SCHOTT (GERMANY) under trade name of FK5:
Glass material manufactured by OHARACO. LTD. (JAPAN) under trade name of S-FSL5.

Glass materials are not limited to the above-mentioned ones and can be changed freely so long as they can satisfy the above-mentioned conditions.

If the collimator lens 2 is made of the glass material that can satisfy the above-mentioned conditions, then even when temperature fluctuates or wavelength fluctuates due to fluctuations of intensity of light from the semiconductor laser 1, the light emission point of the semiconductor laser 1 can lie within the tolerance from the focal point position of the collimator lens 2.

In other words, the focal point position of the collimator lens 2 can constantly follow the optical assembly attachment base 10 even when the optical assembly attachment base 10 is expanded and contracted due to fluctuations of ambient temperature.

Moreover, even when the wavelength of the semiconductor laser 1 is fluctuated approximately several nanometers due to fluctuations of intensity of the emitted light, it is possible to prevent the focal point position of the collimator lens 2 from being fluctuated.

Consequently, the light emitted from the collimator lens 2 can constantly be provided as substantially-collimated light. This substantially-collimated light is focused by the objective lens 8 and thereby can be irradiated on the information recording surface 11a of the optical disc 11 with a predetermined very small beam spot.

While it is considered that a similar refractive index fluctuation to that of the collimator lens 2 will occur also in the objective lens 8 due to fluctuations of temperature, the refractive index fluctuation of this objective lens 8 can easily be corrected by driving the biaxial actuator 9 based upon the focusing error signal detected by the photo-detector 7.

Subsequently, principles of temperature compensation and chromatic aberration compensation will be described with reference to practical and specific glass materials.

Of the aforementioned glass materials, the FC5 manufactured by HOYA CORPORATION was used as the glass material of the collimator lens 2. Abbe number vd in the d line of this glass material was 70.441

Lens data of this collimator lens 2 are indicated on the following table 1.

TABLE 1 effective diameter = 3.5 mm, wavelength λ = 407.5 nm, ambient temperature = 20° C. and lens focal length = 10 mm
with respect to Collimator Lens

| Surface | Radius of curvature (mm) | | Space on axis (mm) | Refractive Index n | Maker/trade name Abbe number vd in d line |
|---|---|---|---|---|---|
| OBJ | ∞ | | ∞ | | |
| STO | ∞ | | 0.0 | | |
| S1 | R: 5.68607 | A: —, 253829 E-3 | 2.00000 | 1.498654 | HOYA/FC5 |
| | K: −0.287552 | B: —, 509308 E-5 | | | 70.441 |
| | | C: —, 843832 E-7 | | | |
| | | D: —, 671072 E-9 | | | |

TABLE 1-continued effective diameter = 3.5 mm, wavelength λ = 407.5 nm,
ambient temperature = 20° C. and lens focal length = 10 mm
with respect to Collimator Lens

| Surface | Radius of curvature (mm) | | Space on axis (mm) | Refractive Index n | Maker/trade name Abbe number vd in d line |
|---|---|---|---|---|---|
| S2 | R: −35.7807 K: 0.0 | A: 0.103825 E-3 B: —, 155745 E-5 C: 0.293379 E-7 D: 0.107015 E-9 | 0.0 0.0 | | |
| S3 | | ∞ | 8.829653 | | |
| IMG | | ∞ | 0.0 | | |

Aspherical equation $$X = \frac{Y^2/R}{1 + \{1 - (1+K)(Y/R)^2\}^{1/2}} + AY^4 + BY^6 + CY^8 + DY^{10} + EY^{12} + FY^{14} + GY^{16}$$

X = depth from vertex of plane
Y = height from optical axis
R = paraxial ray R
K = constant of circular cone
A: aspherical coefficient of $Y^4$ term
B: aspherical coefficient of $Y^6$ term
C: aspherical coefficient of $Y^8$ term
D: aspherical coefficient of $Y^{10}$ term
E: aspherical coefficient of $Y^{12}$ term
F: aspherical coefficient of $Y^{14}$ term
G: aspherical coefficient of $Y^{16}$ term In the table 1, OBJ denotes the information recording surface 11a of the optical disc 11, S1 denotes the curved surface on which the collimator lens 2 opposes the objective lens 8, S2 represents the curved surface on which the collimator lens 2 opposes the light source 1, and S3 denotes the light emitting point of the semiconductor laser 1, respectively.

According to the fundamental design, as shown on the table 1, the focal length of the collimator lens 2 was selected to be 10 mm, the wavelength λ of the semiconductor laser 1 was selected to be 407.5 nm and the temperature T was selected to be 20° C.

First, a principle of temperature compensation (compensation for temperature fluctuations) will be described.

Figure 2A:
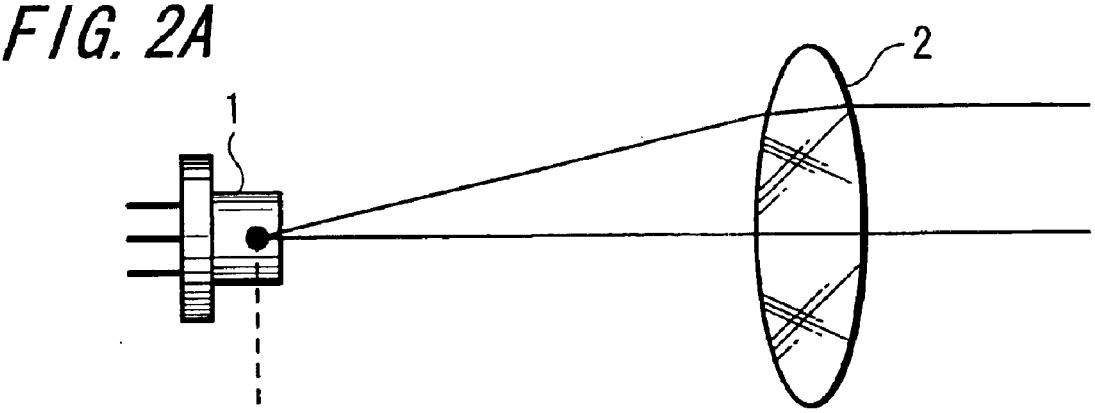
FIGS. 2A and 2B are diagrams to which reference will be made in explaining the manner in which various fluctuations occur due to rise of temperature, respectively.

The optical assembly attachment base 10 shown in FIG. 1 is made of aluminum and magnesium. Linear expansion coefficients α of aluminum and magnesium are as follows:
Aluminum: α/K=23.3×10$^{-6}$
Magnesium: α/K=25.6×10$^{-6}$ As shown in FIG. 2A, at temperature (20° C.) of the fundamental design, light that has passed through the collimator lens 2 is collimated light.

On the other hand, when ambient temperature rises (e.g., when ambient temperature rises +30° C. and reaches 50° C.), the aforementioned fluctuations (1) to (4) will occur.

Figure 2B:
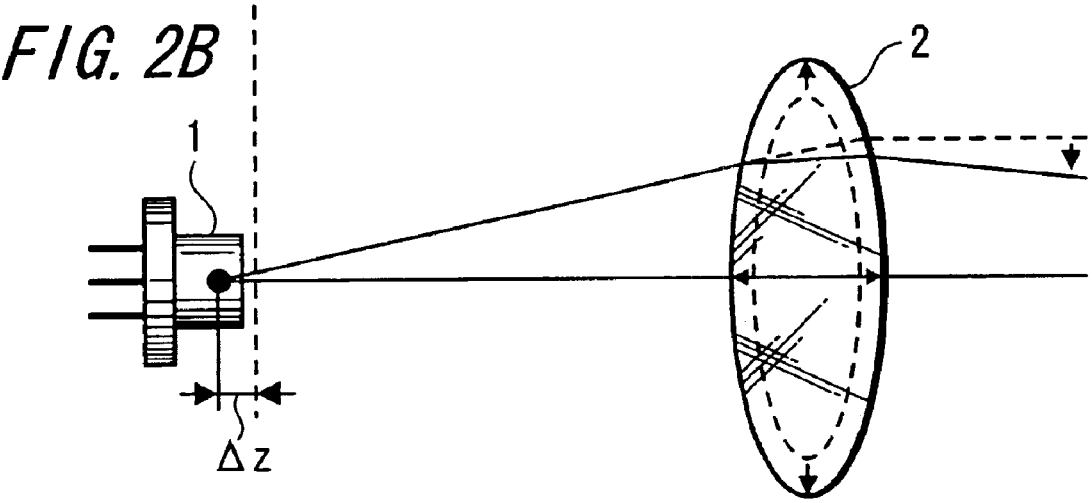

That is, to be more concrete, the following fluctuations will occur as shown in FIG. 2B.

(1) As the optical assembly attachment base 10 is expanded and contracted (linear expansion coefficient α×temperature fluctuation Δt×focal length f), the space between the semiconductor laser 1 and the collimator lens 2 is fluctuated. As shown in FIG. 2B, the space between the semiconductor laser 1 and the collimator lens 2 increases Δz.

(2) As the wavelength of the semiconductor laser 1 is fluctuated (coefficient dλ/dt×temperature fluctuation Δt), the refractive index of the collimator lens 2 is fluctuated.

(3) As temperature rises, the refractive index of the collimator lens 2 is fluctuated (coefficient dλ/dt×temperature fluctuation Δt).

(4) The collimator lens 2 itself is expanded and contracted (1+linear expansion coefficient α×temperature fluctuation Δt). As shown in FIG. 2B, the collimator lens 2 is expanded and increased in size.

As a result of these fluctuations, the light emitted from the collimator lens 2 changes from collimated light to converged light as shown in FIG. 2B, for example.

Accordingly, with respect to temperature compensation, by equalizing the fluctuation amounts of (1) expansion and contraction of the optical assembly attachment base 10 and (2) to (4) the change of refractive index of the collimator lens 2 and expansion and coefficient, the focal point position of the collimator lens 2 can follow the light emission point of the semiconductor laser 1 after temperature has been fluctuated.

When the optical assembly attachment base 10 is made of aluminum and rise of ambient temperature is +30° C. (when temperature rises from 20° C. to 50° C.), the increased amount Δz of the space between the collimator lens 2 and the semiconductor laser 1 is given by the following equation:

Δz=linear expansion coefficient×change of temperature×focal length=23.3×10$^{-6}$×30×10=+0.0699 mm (+6.99μm)

When the amount in which the wavelength of the semiconductor laser 1 is fluctuated due the rise of temperature of +30° C. is assumed to be +2 nm, the amount in which the refractive index of the collimator lens 2 is fluctuated due to the wavelength fluctuation increases from 1.498654 (wavelength is 407.5 nm) to 1.498443 (wavelength is 409.5 nm).

A ratio in which the refractive index of the collimator lens 2 changes due to change of temperature as the temperature increases +30° C. is given as:

(dn/dt)/K=−0.3×10$^{-6}$

Accordingly, when the temperature reaches 50° C. after temperature has been raised +30° C., the refractive index of the collimator lens 2 is given as:

$$1.498443 - 0.3 \times 10^{-6} \times 30 = 1.408434$$

Further, the linear expansion coefficient of the collimator lens 2 itself is given as $\alpha/K = 95 \times 10^{-7}$.

Consequently, lens data obtained when the temperature is raised +30° C. and reaches 50° C. are changed as shown on the following table 2.

Figure 3:
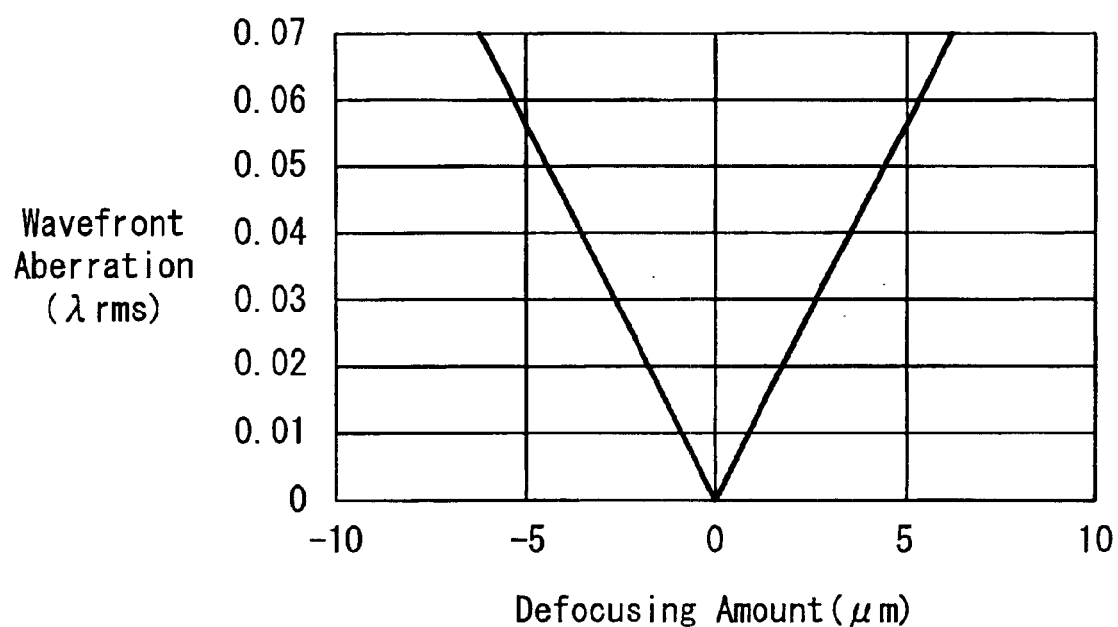
FIG. 3 is a diagram showing results obtained when wavefront aberration caused by focal point errors was calculated.

Accordingly, a study of FIG. 3 reveals that it is desired that the amount of focal length error should be less than ±3 μm (±0.003 mm).

Furthermore, since the amount of error occurred between the focal point position of the collimator lens 2 and the light emission point of the semiconductor laser 1 due to the above-mentioned fluctuation of temperature is given as 0.0072−0.00699=0.00021 mm, it is to be understood that the amount of the generated wavefront aberration is sufficiently small.

TABLE 2 effective diameter = 3.5 mm, wavelength λ = 409.5 nm, ambient temperature = 50° C. and lens focal length = 10.0072 mm with respect to Collimator Lens

| Surface | Radius of curvature (mm) | | Space on axis (mm) | Refractive Index n | Maker/trade name Abbe number vd in d line |
|---|---|---|---|---|---|
| OBJ | | ∞ | ∞ | | |
| STO | | ∞ | 0.0 | | |
| S1 | R: 5.68769 | A: —, 253612 E-3 | 2.00057 | 1.498434 | HOYA/FC5 |
| | K: −0.287552 | B: —, 508583 E-5 | | | 70.441 |
| | | C: —, 842151 E-7 | | | |
| | | D: —, 669653 E-9 | | | |
| S2 | R: −35.7997 | A: 0.103736 E-3 | 0.0 | | |
| | K: 0.0 | B: —, 155523 E-5 | | | |
| | | C: 0.292794 E-7 | | | |
| | | D: 0.106761 E-9 | | | |
| S3 | | ∞ | 8.836401 | | |
| IMG | | ∞ | 0.0 | | |

Aspherical equation $$X = \frac{Y^2/R}{1 + \{1 - (1 + K)(Y/R)^2\}^{1/2}} + AY^4 + BY^6 + CY^8 + DY^{10} + EY^{12} + FY^{14} + GY^{16}$$

X = depth from vertex of plane
Y = height from optical axis
R = paraxial ray R
K = constant of circular cone
A: aspherical coefficient of $Y^4$ term
B: aspherical coefficient of $Y^6$ term
C: aspherical coefficient of $Y^8$ term
D: aspherical coefficient of $Y^{10}$ term
E: aspherical coefficient of $Y^{12}$ term
F: aspherical coefficient of $Y^{14}$ term
G: aspherical coefficient of $Y^{16}$ term From the table 2, it is to be understood that aspherical coefficients are changed in both curved surfaces S1, S2 of the collimator lens 2.

From the table 2, it is to be understood that the fluctuation of the focal length of the collimator lens 2 is +0.0072 mm.

Accordingly, it is to be understood that the fluctuation amount of +0.0072 mm of the focal length of the collimator lens 2 might substantially follow the expanded amount of +0.00699 mm of the aforementioned optical assembly attachment base 10.

Herein, we have calculated wavefront aberration caused by focal length error. FIG. 3 shows calculated results of wavefront aberration. The vertical axis in FIG. 3 represents the wavefront aberration (λrms) and the horizontal axis represents the defocusing amount (μm), i.e., amount of focal length error.

Wavefront aberration has a numerical value of 0.07 λrms called "Marechal's standard" from an optics standpoint, and the optical assembly is satisfactory when wavefront aberration is less than the Marechal's standard. An optical assembly should preferably have wavefront aberration less than 0.035 λrms.

Next, a principle of chromatic aberration compensation will be described.

When the optical pickup device is switched from the reproducing mode to the recording mode, intensity of the output from the semiconductor laser 1 is changed, and its oscillation wavelength λ is changed.

When the intensity of light emitted from the semiconductor laser 1 is changed in the increasing direction, if the oscillation wavelength λ changes +1 nm, then the refractive index of the collimator lens 2 changes relative to the oscillation wavelength λ so that the focal length of the collimator lens 2 changes.

On the other hand, the distance between the collimator lens 2 and the light emission point of the semiconductor laser 1 is equal to a time point at which the space was adjusted beforehand in the state in which intensity of light emitted from the semiconductor laser 1 is low. As a result, light emitted from the collimator lens 2 is no longer collimated light and it becomes slightly diverging light or converging light.

Figure 4A:
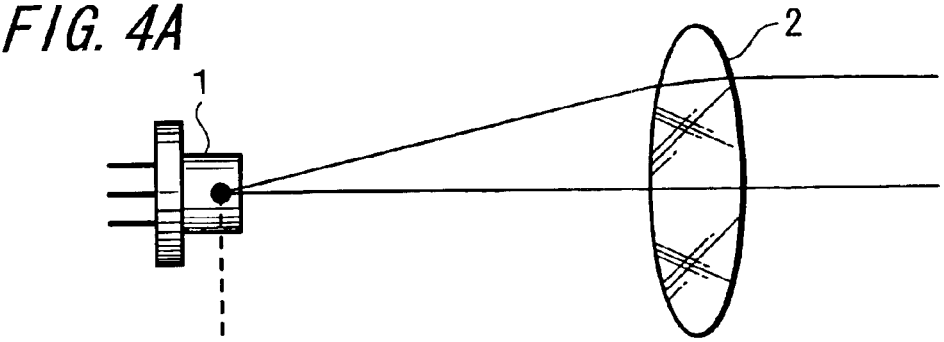
FIGS. 4A and 4B are respectively diagrams to which reference will be made in explaining chromatic aberration caused when a wavelength of light fluctuates in accordance with fluctuations of an output.

For example, in the oscillation wavelength (407.5 nm) of the fundamental design, since intensity of the output from the semiconductor laser 1 is identical to the intensity of the output obtained in the reference time at which the space between the semiconductor laser 1 and the collimator lens 2 was adjusted, as shown in FIG. 4A, light that has passed through the collimator lens 2 becomes collimated light.

On the other hand, when intensity of the output from the semiconductor laser 1 increases so that the oscillation wavelength λ is fluctuated Δλ from the fundamental design value, i.e., increases +1 nm, for example, the refractive index of the collimator lens 2 fluctuates due to the fluctuation of the wavelength, thereby causing chromatic aberration to occur.

Figure 4B:
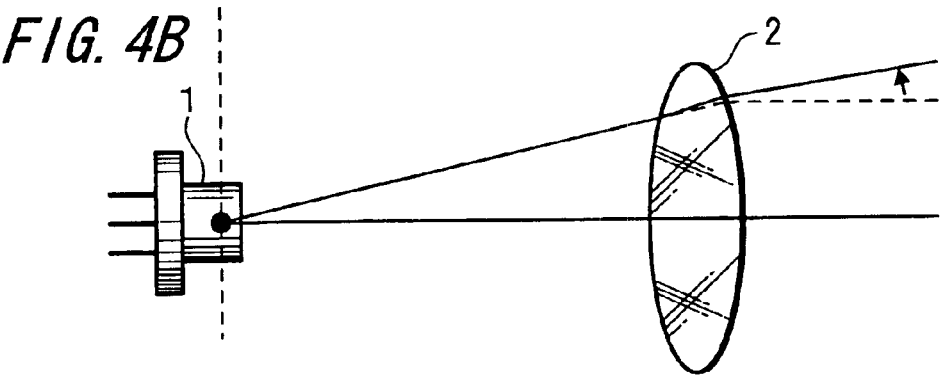

As a result, the light from the collimator lens 2 changes from collimated light to diverging light as shown in FIG. 4B, for example.

Therefore, with respect to the compensation for the chromatic aberration, the collimator lens 2 is designed in such a manner that the fluctuated amount of the focal length f may fall within a tolerance when the focal length f of the collimator lens 2 fluctuates as the refractive index of the collimator lens 2 fluctuates due to the wavelength fluctuation of the semiconductor laser 1.

Lens data obtained in the most properly focused state when the oscillation wavelength λ is changed +1 nm from the state of the table 1 are indicated on the following table 3.

the optical constant indicative of refractive index chromatic dispersion characteristic of glass, is large.

The larger Abbe number v the glass material has, the lesser the refractive index is fluctuated relative to the fluctuation of the wavelength.

Properties of glass materials for use with the collimator lens 2 are slightly fluctuated depending upon glass material manufacturers.

According to the results obtained from the simulation of the lens design, it was confirmed that, even when such properties of glass materials are fluctuated, if such fluctuations fall within the respective ranges of the aforementioned Abbe number v, linear expansion coefficient α and temperature coefficient of the refractive index, the focal length errors decrease sufficiently to become less than 0.001 mm.

According to the above-mentioned arrangement of the optical pickup device 20 of this embodiment, since the optical pickup device 20 includes the collimator lens 2 made of the glass material of which fluctuations of properties may fall within the respective ranges of the aforementioned Abbe number, linear expansion coefficient and temperature coefficient of the refractive index, under the circumstances in which the optical pickup device 20 is in use while the temperature is being fluctuated, the focal point position of the collimator lens 2 can constantly follow the movement of

TABLE 3 effective diameter = 3.5 mm, wavelength λ = 408.5 nm, ambient temperature = 20° C. and lens focal length = 10.0021 mm with respect to Collimator Lens

| Surface | Radius of curvature (mm) | | Space on axis (mm) | Refractive Index n | Maker/trade name Abbe number vd in d line |
|---|---|---|---|---|---|
| OBJ | ∞ | | ∞ | | |
| STO | ∞ | | 0.0 | | |
| S1 | R: 5.68607 | A: —, 253829 E-3 | 2.00000 | 1.498548 | HOYA/FC5 |
|  | K: −0.287552 | B: —, 509308 E-5 | | | 70.441 |
|  |  | C: —, 843832 E-7 | | | |
|  |  | D: —, 671072 E-9 | | | |
| S2 | R: −35.7807 | A: 0.103825 E-3 | 0.0 | | |
|  | K: 0.0 | B: —, 155745 E-5 | | | |
|  |  | C: 0.293379 E-7 | | | |
|  |  | D: 0.107015 E-9 | | | |
| S3 | ∞ | | 8.831688 | | |
| IMG | ∞ | | 0.0 | | |

Aspherical equation $$X = \frac{Y^2/R}{1 + \{1 - (1+K)(Y/R)^2\}^{1/2}} + AY^4 + BY^6 + CY^8 + DY^{10} + EY^{12} + FY^{14} + GY^{16}$$

X = depth from vertex of plane
Y = height from optical axis
R = paraxial ray R
K = constant of circular cone
A: aspherical coefficient of $Y^4$ term
B: aspherical coefficient of $Y^6$ term
C: aspherical coefficient of $Y^8$ term
D: aspherical coefficient of $Y^{10}$ term
E: aspherical coefficient of $Y^{12}$ term
F: aspherical coefficient of $Y^{14}$ term
G: aspherical coefficient of $Y^{16}$ term As is clear from the table 3, the changed amount of the focal length f of the collimator lens 2 is +0.0021 mm.

A study of the table 3 reveals that the amount in which the focal length is changed due to the chromatic aberration also is a small value that may fall within the tolerance.

This is the effect achieved when the collimator lens 2 is made of a glass material of which Abbe number v, which is the light emission point of the semiconductor laser 1. Hence, the light from the collimator lens 2 can be constantly provided as collimated light (or substantially-collimated light), and information can accurately be recorded on and reproduced from the optical disc 11 by light focused by the objective lens 8.

Even when the oscillation wavelength λ is fluctuated about several nanometers, for example due to the change of intensity of light emitted from the semiconductor laser 1, since the focal point position of the collimator lens 2 can be substantially prevented from being moved from the position of the light emission point of the semiconductor laser 1 and the moving amount of the focal point position of the collimator lens 2 is suppressed so as to fall within the tolerance, the light from the collimator lens 2 can constantly be provided as collimated light (or substantially-collimated light), and hence information can be recorded on and reproduced from the optical recording medium 11 by the light focused by the objective lens 8.

Further, since the collimator lens 2 consists of only one element, it is possible to achieve the above-mentioned action and effects inexpensively from a money standpoint.

While the optical pickup device 20 according to this embodiment has the arrangement in which the collimator lens 2 is located between the semiconductor laser 1 and the polarizing beam splitter 3 to allow only the light L1 emitted from the semiconductor laser 1 to pass through the collimator lens 2, according to the present invention, the position at which the collimator lens 2 is located is not limited to the position between the semiconductor laser 1 and the polarizing beam splitter 3.

For example, there has been proposed an optical system having an arrangement in which a collimator lens is located between a quarter-wave plate and a polarizing beam splitter to allow both of light emitted from a semiconductor laser and returned light from an optical recording medium to pass through the collimator lens. The present invention can similarly be applied to an optical pickup device having the above-mentioned proposed optical system. Also in this case, if the collimator lens is made of a glass material that can satisfy the above-mentioned conditions, then even when the fluctuation of wavelength occurs due to the fluctuation of temperature and the fluctuation of output, the light from the collimator lens can be collimated as substantially-collimated light.

Figure 5:
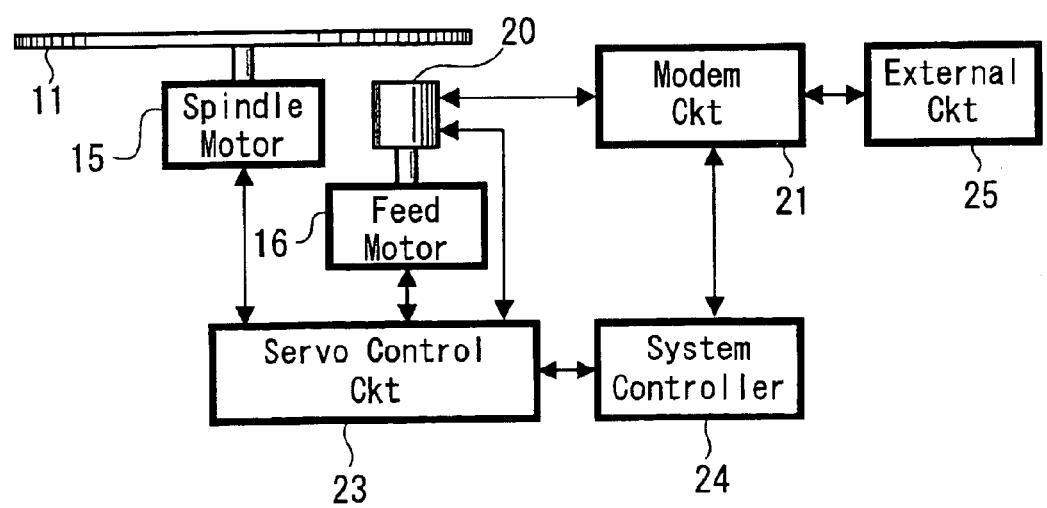
FIG. 5 is s diagrams schematically showing an arrangement of an optical recording and reproducing apparatus according to an embodiment of the present invention.

Subsequently, an optical recording and reproducing apparatus including the above-mentioned optical pickup device 20 according to this embodiment will be described with reference to FIG. 5. FIG. 5 is a schematic diagram, partly in block form, showing an arrangement of a recording and reproducing apparatus (i.e., recording and reproducing apparatus according to the embodiment of the present invention) which is a representing recording and reproducing apparatus of the optical recording and reproducing apparatus.

As shown in FIG. 5, this optical recording and reproducing apparatus is composed of a spindle motor 15, a feed motor 16, the optical pickup device 20 and the like. These components are controlled by a system controller 24 that may control the whole of the optical recording and reproducing apparatus.

The optical pickup device 20 is moved in the tracking direction by a control drive means consisting of a guide mechanism (not shown) and the feed motor 16 composed of a linear motor and the like. When the optical recording medium (e.g., optical disc) 11 chucked to the spindle motor 15, for example, is reproduced, the system controller 24 supplies a control signal to a servo control circuit 23 and a modem (modulator and demodulator) circuit 21. The servo control circuit 23 rotates the spindle motor 15 at revolutions set in the focusing locked state and drives the feed motor 16 in response to the control signal supplied thereto to move the optical pickup device 20 to the inner peripheral side of the optical recording medium 11, for example. By the focus search operation, focusing servo is applied to the optical pickup device 20 that has been moved toward the inner periphery of the optical recording medium 11 and tracking servo will be applied to the optical pickup device 20 later on.

A focusing error signal, a tracking error signal and position information, which indicates reproduced position on the optical recording medium, detected by the photo-detector 7 comprising the optical pickup device 20 are supplied to the modem circuit 21.

The focusing error signal and the tracking error signal are filtered out and supplied through the system controller 24 to the servo control circuit 23 as a focusing control signal and a tracking control signal.

This servo control circuit 23 drives a focusing coil of the biaxial actuator 9, for example, comprising the optical pickup device 20 in response to the focusing control signal, and also drives the tracking coil of the biaxial actuator 9 in response to the tracking control signal.

A low band component of the tracking control signal is supplied through the system controller 24 to the servo control circuit 23, thereby driving the feed motor 16.

Thus, the focusing servo, the tracking servo and the feedback servo of the feed servo are carried out.

The position information indicative of the reproducing position of the optical recording medium 11 is processed by the modem circuit 21. The thus processed signal from the modem circuit 21 is supplied to the spindle motor 15 as a spindle control signal and thereby the spindle motor 15 is driven at predetermined revolution corresponding to the playback position of the optical recording medium 11 chucked to the spindle motor 15, thereby resulting in the practical reproduction of the optical recording medium 11 being started.

Then, reproduced data processed and demodulated by the modem circuit 21 is transmitted through an external circuit 25 to the outside.

When external data supplied from the outside, for example, is recorded on the optical recording medium 11 chucked to the spindle motor 15, the optical recording and reproducing apparatus according to the present invention passes a similar process to that of the playback until the focusing servo, the tracking servo and the feedback servo of the feed servo are applied to the optical pickup device 20.

Next, the system control circuit 24 supplies a control signal, which indicates the position at which input data inputted through the external circuit 25 is to be recorded on the optical recording medium 11, to the servo control circuit 23 and the modem circuit 21. The servo control circuit 23 controls the spindle motor 15 so that the spindle motor 15 may rotate at predetermined revolutions, and also drives the feed motor 16 to move the optical pickup device 20 to the information recording position.

The input signal inputted to the modem circuit 21 through the external circuit 25 is modulated based upon a recording format by the modem circuit 21 and supplied to the optical pickup device 20.

The optical pickup device 20 modulates the emitted light L1 based on the modulated signal and controls power of the emitted light L1 based on the information recording position, whereby laser light is irradiated on the optical recording medium 11 to start recording information on the optical recording medium 11.

When the optical recording medium is a so-called CAV (constant angular velocity) disc that is recorded and reproduced at constant angular velocity, position information indicative of the reproduction position of the optical recording medium 11 is not required, and hence the spindle motor 15 is controlled so as to rotate at predetermined constant revolutions.

The present invention can be applied to an optical pickup device capable of recording and reproducing a ROM (read-only memory) type optical disc represented by CD or the like, a RAM (random-access memory) type optical disc represented by a phase-change disc and a magneto-optical disc or an optical recording medium such as an optical memory card.

Further, the present invention can be applied to an optical recording and reproducing apparatus including the optical pickup device.

If the arrangement of the optical pickup device according to the present invention is applied to an optical pickup device for use with an optical recording and reproducing apparatus capable of both recording and reproducing information, then and the optical recording and reproducing apparatus can effectively compensate for fluctuations of temperature and chromatic aberration caused by fluctuations of intensity of light, and hence can be applied to the optical recording medium that can increase recording density and storage capacity much more.

According to the present invention, under the circumstances in which the optical pickup device is in use while ambient temperature is being fluctuated, the focal point position of the collimator lens can constantly follow the movement of the light emission point of the semiconductor laser, the light emitted from the collimator lens can constantly be provided as substantially-collimated light, and hence information can be reproduced from and recorded on the optical recording medium at high accuracy.

Further, according to the present invention, even when the oscillation wavelength is fluctuated due to the fluctuation of intensity of the output light from the semiconductor laser, the movement of the focal point position of the collimator lens relative to the light emission point of the semiconductor laser can be suppressed to a very small movement amount within the tolerance, the light from the collimator lens can constantly be provided as substantially-collimated light, and hence information can be reproduced from and recorded on the optical recording medium at high accuracy.

Furthermore, even when the collimator is composed of only one element, the above-mentioned action and effects can be achieved, and hence a cost of the collimator lens can be suppressed to be low.

Therefore, according to the present invention, it becomes possible to construct relatively inexpensively an optical pickup device by which fluctuations of temperature and fluctuations of oscillation wavelength due to fluctuations of intensity of the output can be compensated for at high accuracy.

In consequence, it becomes possible to easily cope with an optical recording medium which will become higher in recording density and larger in storage capacity.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An optical pickup device comprising:

an objective lens;

a light source composed of a blue semiconductor laser with a wavelength ranging from 400 nm to 415 nm; and a collimator lens for collimating light from said light source to provide substantially-collimated light, wherein Abbe number ν of a glass material of said collimator lens satisfies $61<\nu<90$, a linear expansion coefficient α satisfies $55<10^7\times\alpha/K<120$, and a refractive index temperature coefficient (dn/dt) satisfies $-1.8<10^6\times(dn/dt)/K<+1.5$.

2. An optical recording and reproducing apparatus comprising:

an optical pickup device; and control means for controlling driving of said optical pickup device, said optical pickup device comprising:

an objective lens, a light source composed of a blue semiconductor laser with a wavelength ranging from 400 nm to 415 nm and a collimator lens for collimating light from said light source to provide substantially-collimated light, wherein Abbe number ν of a glass material of said collimator lens satisfies $61<\nu<90$, a linear expansion coefficient α satisfies $55<10^7\times\alpha/K<120$, and a refractive index temperature coefficient (dn/dt) satisfies $-1.8<10^6\times(dn/dt)/K<+1.5$.

* * * * *